United States Patent
Mentink et al.

(10) Patent No.: US 7,204,083 B2
(45) Date of Patent: Apr. 17, 2007

(54) HYDRAULIC ACTUATING DEVICE FOR A CONVERTIBLE TOP ASSEMBLY OF A VEHICLE

(75) Inventors: Laurentius Andreas Gerardus Mentink, Haaksbergen (NL); Johnny Antonius Jacobus Wiggemans, Oldenzaal (NL)

(73) Assignee: Actuant Corporation, Glendale, WI (US)

( * ) Notice: Subject to any disclaimer, the term of this patent is extended or adjusted under 35 U.S.C. 154(b) by 0 days.

(21) Appl. No.: 11/061,246

(22) Filed: Feb. 18, 2005

(65) Prior Publication Data
US 2005/0144939 A1    Jul. 7, 2005

Related U.S. Application Data

(62) Division of application No. 10/227,261, filed on Aug. 22, 2002, now Pat. No. 6,981,372.

(51) Int. Cl.
*F16D 31/02* (2006.01)
(52) U.S. Cl. .......... 60/328; 296/117
(58) Field of Classification Search .......... 60/328, 60/468; 296/117
See application file for complete search history.

(56) References Cited

U.S. PATENT DOCUMENTS

| 3,407,894 | A | * | 10/1968 | Thompson et al. | 60/328 |
| 5,493,861 | A | * | 2/1996 | Friedrichsen | 60/328 |
| 5,724,878 | A | | 3/1998 | Stolle et al. | |
| 5,778,671 | A | | 7/1998 | Bloomquist et al. | |
| 5,944,159 | A | | 8/1999 | Schneider et al. | |
| 6,273,492 | B1 | | 8/2001 | Schroder et al. | |
| 6,299,233 | B1 | * | 10/2001 | Mentink | 296/117 |

* cited by examiner

*Primary Examiner*—F. Daniel Lopez
(74) *Attorney, Agent, or Firm*—Quarles & Brady LLP (57) ABSTRACT

A hydraulic actuating device for a convertible top assembly of a motor vehicle. The actuating device comprises a hydraulic pump with an associated electric pump motor and one or more hydraulic actuators, each for driving an associated movable part of the convertible top assembly. The actuating device also comprises a control circuit for effecting a defined sequence of movements of the one or more actuators and feedback means, which are connected to the control unit, for feeding information relating to the sequence of movements of an actuator back to the control unit. The feedback means comprise means for measuring the electric power consumed by the pump motor, which means transmit a feedback signal to the control unit.

26 Claims, 5 Drawing Sheets

HYDRAULIC ACTUATING DEVICE FOR A CONVERTIBLE TOP ASSEMBLY OF A VEHICLE

CROSS-REFERENCE TO RELATED APPLICATIONS

This application is a divisional of U.S. patent application Ser. No. 10/227,261 filed on Aug. 22, 2002, which claims priority to PCT/NL01/00132 filed 16 Feb. 2001, which PCT application claims the priority of Dutch patent application number 1014476 filed 23 Feb. 2000, all incorporated herein by reference.

FIELD OF THE INVENTION

The invention relates to the control of an electro-hydraulic actuating device of a convertible top assembly of a motor vehicle, which convertible top assembly comprises a movable convertible top, by means of which the passenger compartment of the vehicle can be completely or partially covered or opened, as desired. The convertible top may be of all kinds of possible designs, for example with a flexible cloth which is supported by a movable bow structure or an embodiment with one or more rigid convertible top elements.

BACKGROUND OF THE INVENTION

Examples of hydraulic actuating devices for a convertible top assembly of a motor vehicle are described, inter alia, in EP 0 693 389 and DE 38 26 788. In these known actuating devices, the feedback means which feed back information relating to the sequence of movements of the hydraulic actuators are designed as position sensors arranged at the actuators in the form of switches which are actuated when the associated actuator reaches a defined position. The position sensors are limit-position sensors which detect whether the associated hydraulic actuator has reached one of its limit positions. In the known devices, the output signals from these position sensors are used in particular as feedback signals in the control circuit for controlling the sequence of movements of the various parts of the convertible top assembly, such as the convertible top itself, which may comprise a plurality of separately actuable components, and furthermore possibly a tonneau cover, a boot lid, latches, windows or, for example, a roll bar of the vehicle.

Limit-position sensors are reliable and relatively inexpensive. However, in practice a movable component of a convertible top assembly often does not have an accurately defined limit position, but rather a range within which the limit position may vary as a function of, for example, manufacturing tolerances and play in the structure, (thermal) deformation of the components of the convertible top assembly or the compressibility of seals between the convertible top and the body or between parts of the convertible top. For this reason, with actuating devices of this type it is currently customary to arrange a limit-position sensor in such a manner that the sensor is activated a short distance from the limit position which is actually intended, for example 10 millimeters before this limit position, as seen in the direction of movement of the actuator. This limit-position sensor remains activated during the further displacement of the actuator towards the said limit position. Then, as soon as the limit-position sensor indicates to the control unit that the actuator has activated the limit-position sensor, the control unit causes that the said actuator remains hydraulically energized for a predefined time. This time lag, is selected in such a manner that the actual limit position is reached under all circumstances. In practice, this may mean that a time lag of, for example, 0.5 second is adopted. However, depending on conditions, this time lag may be excessively long. By way of example, the actual limit position may be reached after 0.2 second. This in fact means waiting for an unnecessary 0.3 second. On the market, it is desirable for a sequence of movements of a convertible top assembly to be carried out as quickly as possible and with a smooth movement which is not jerky, time gains of one or more seconds being relevant to the complete opening or closure of the convertible top. Particularly if one component, for example the convertible top, of the convertible top assembly is only actuated when the movement of another component, for example the tonneau cover, has been completed, the abovementioned situation causes an undesirable delay and means that the movement of the convertible top assembly is not smooth.

In a hydraulic actuating device for a convertible top assembly of a motor vehicle, it is also known, for example from EP 0 550 952, to use one or more position sensors which are able to detect the position of the hydraulic actuator or the associated movable component of the convertible top assembly over a defined range. Position sensors of this type are considerable more expensive than the limit-position sensors described above and, moreover, do not offer a practical solution to the abovementioned problem. By way of example, the question of whether or not a convertible top of a motor vehicle has completely closed is a matter of millimeters at the location where the convertible top adjoins the body, even though a compressible seal does offer some compensation. If, in this case, the position sensor is, for example, an angle sensor which is arranged between two pivoting components of the convertible top structure, it would have to be an accurate angle sensor in order to detect the relevant distance with sufficient accuracy. In order nevertheless to be able to use less accurate sensors, in practice it is chosen to detect a limit position by analysing whether the feedback signal from the angle sensor used remains constant for a defined time, so that it is certain that the actuator and/or the associated part of the convertible top assembly has reached its limit position.

Another known embodiment of the feedback means in a control system for a hydraulically actuated convertible top assembly of a motor vehicle is described in U.S. Pat. No. 5,724,878. In this case, the feedback is primarily based on measuring the actual pressure in the hydraulic system. This pressure measurement may possibly be used in combination with limit-position sensors, as described in U.S. Pat. No. 5,724,878. However, this requires the use of a high-quality pressure gauge, in view of the required accuracy, service life and operating conditions. A pressure gauge of this type is undesirably expensive. EP 0 916 535 proposes special actuators which can be used in combination with this pressure measurement.

OBJECTS OF THE INVENTION

A first object of the invention is to provide an improved hydraulic actuating device for a convertible top assembly of a motor vehicle.

A further object of the invention is to provide a control system for a convertible top assembly of a motor vehicle in which it is no longer necessary to adopt fixed—and therefore excessively long—time lags, so that the sequence of movements can be implemented at an optimum speed.

Another object of the invention is to provide a control system for the convertible top assembly which is attractive in terms of its cost price and technical implementation.

SUMMARY OF THE INVENTION

According to a first aspect, the invention provides a hydraulic actuating device for a convertible top assembly of a motor vehicle, which actuating device comprises:

- a hydraulic pump with an associated electric pump motor,
- one or more hydraulic actuators, each for driving an associated moveable part of the convertible top assembly,
- a control circuit for effecting a defined sequence of movements of the one or more hydraulic actuators,
- which control circuit comprises a control unit and feedback means, the feedback means being designed to feed information relating to the sequence of movements of an actuator back to the control unit, wherein the feedback means comprise pump power measuring means for measuring the electric power consumed by the pump motor, which pump power measuring means transmit a feedback signal to the control unit.

This measure according to the invention is based on the insight that it is easy to measure the electric power consumed by the pump motor. For example, assuming that the electrical supply voltage to the pump motor is virtually constant, the intensity of the electric current passing through the pump motor can be measured. By way of example, a low-resistance resistor can be positioned in the electrical line to the pump motor, which is generally a low-voltage DC motor, the voltage drop across this resistor being measured. The said voltage drop signal is then representative of the electric power consumed by the pump motor and is fed to the control unit as a feedback signal.

If the supply voltage to the pump motor cannot be considered to be constant, it is possible to provide for the present supply voltage to the pump motor to be measured, so that the electric power consumed by the pump motor can be established on the basis of the supply voltage and the current intensity.

The electric power consumed by the pump motor, with some loss, is converted by the hydraulic pump into a defined delivery of hydraulic fluid at a defined pressure. The pump delivery is constant for many pumps and is at any rate known. Therefore, measuring the current intensity passing through the pump motor offers the possibility of indirectly determining the hydraulic pressure, so that there is no need to use an expensive pressure gauge.

It should be noted that it is known to detect whether the current intensity consumed by the pump motor exceeds a set maximum with a view to protecting the control unit and the pump motor against short-circuiting. It is conceivable for the same current intensity-measuring means moreover to be used in the manner according to the present invention as feedback means in the control circuit for controlling the sequence of movements of the convertible top assembly.

With actuating devices of this type, it is also already known to measure the supply voltage, for example in order to prevent the actuating device being set in operation if the battery voltage of the motor vehicle is low. The known means for measuring this supply voltage can therefore now also be used for the determination of the electric power consumed by the pump motor and therefore as a component of the control circuit for controlling the sequence of movements of the convertible top assembly.

The determination of the electric power consumed by the pump motor can also be utilized to establish whether the sequence of movements of the parts of the convertible top assembly is being inadvertently blocked, for example because an attempt is being made to close the convertible top assembly in a garage and the convertible top is coming into contact with the garage ceiling.

In one possible embodiment, the control unit comprises a memory, in which a desired profile of the behaviour of the feedback signal from the pump power-measuring means during the sequence of movements is stored, which profile at least relates to a section of the sequence of movements of the one or more actuators, and the control unit is designed to compare the present feedback signal from the pump power-measuring means with the predefined, desired profile of the said feedback signal. In this way, the control unit is able to detect, for example, the position at which an actuator is situated.

The behaviour of the electric power consumed by the pump motor may involve an (absolute) value, but also, in combination therewith or as an alternative, may involve the change in the consumed electric power during the sequence of movements or a section thereof. For example, if an actuator has reached a limit position, the electric power consumed by the pump motor will often increase. The control unit may then be designed to detect whether the value of the electric power consumed exceeds a predetermined value. On the other hand, a sudden increase in the electric power consumed by the pump could also be detected and used by the control unit, for example in order to prevent jamming.

In an embodiment which is advantageous in practice, it is provided for the control unit to be designed to establish—within a predefined time period—whether a moving actuator has reached a limit position, by detecting whether the feedback signal from the measuring means reaches a predefined value.

It is advantageously possible to provide for the period of time within which the control unit attempts to detect whether the limit position of a hydraulic actuator has been reached to start after a feedback signal from a position sensor associated with the said actuator indicates that the said actuator has reached a predefined position. This position may, for example, lie just before the intended limit position.

A second aspect of the invention provides a hydraulic actuating device for a convertible top assembly of a motor vehicle, which actuating device comprises:

- a hydraulic pump with one or more pump elements which are able to execute a pumping movement for pumping hydraulic fluid,
- an associated electric pump motor, a rotatable shaft of which is coupled to the pump,
- one or more hydraulic actuators, each for driving an associated movable part of the convertible top assembly,
- a control circuit for effecting a defined sequence of movements of the one or more actuators,
- which control circuit comprises a control unit and feedback means, which feedback means are designed to feed information relating to the sequence of movements of an actuator back to the control unit, which is characterized in that the feedback means are designed to—directly or indirectly—detect pumping movements executed by the pump elements.

The term pumping movement encompasses not only the reciprocating movement of the plunger of a radial or axial plunger pump, but also, for example, the revolutions of the pump element of a gerotor pump or other gear pump.

The measure according to the second aspect of the invention is based on the idea that a pumping movement leads to the delivery of a volume of hydraulic fluid which is known in advance and therefore to a displacement of the actuator to which this fluid is supplied which is known per se. In this way, it is possible in a simple manner to feed information concerning the position of the actuators and therefore of the components of the convertible top assembly back to the control unit.

In practice, convertible top assemblies often make use of a high-speed electric pump motor of the low-voltage type which drives the pump, often a radial plunger pump, for example at a rotational speed of 3000 rpm of the motor shaft. In practice, a few hundred revolutions of the motor shaft of the pump motor are often required for a section of the sequence of movements of the convertible top assembly in question, for example the opening or closure of the tonneau cover. If, for example, around midway through this movement another movement can start, for example a movement of the convertible top, the counting of the number of revolutions of the motor shaft starting from when the tonneau cover actuator is set in motion represents a sufficiently accurate and usable feedback signal for controlling the sequence of movements of the convertible top.

Incidentally, the volume delivered per pumping movement does not have to be precisely known. For example, it is possible for the control unit to have a learning mode, in which the convertible top assembly executes a sequence of movements and the control unit "learns" how many pumping movements are required for each section of the sequence of movements, the beginning and end of the said section being detected by limit-position sensors, if appropriate. It is also possible for the control unit to continuously compare the expected number of pumping movements, which is stored in a memory, with the number of pumping movements actually required and, in the event of a difference, to adapt the expected number of pumping movements as appropriate. In this way, by way of example, the effect of wear to the pump on the pump delivery is automatically corrected for.

If the volume of fluid delivered per detected pumping movement cannot be considered to be constant and the variation in this volume may cause problems, it is possible to provide for the said volume to be determined on the basis of one or more other parameters. For example, the said volume per pumping movement may be dependent on the rotational speed and/or the temperature and/or the hydraulic pressure, in which case it is provided that a signal which indicates the present value of these parameters be supplied to the control unit via a suitable sensor. In many cases, however, in practice it will be possible to assume that the volume pumped per pumping movement is constant.

A third aspect of the present invention provides a hydraulic actuating device for a convertible top assembly of a motor vehicle, which actuating device comprises:
   a hydraulic pump with an associated electric pump motor, which pump has one or more delivery ports for delivering pressurized hydraulic fluid,
   a reservoir for hydraulic fluid,
   a pressure-relief valve, which is able to connect the one or more delivery ports of the pump to the reservoir if the hydraulic pressure exceeds a defined value,
   one or more hydraulic actuators, each for driving an associated movable part of the convertible top assembly,
   a control circuit for effecting a defined sequence of movements of the one or more actuators,
      which control circuit comprises a control unit and feedback means, which feedback means are designed to feed information relating to the sequence of movements of an actuator back to the control unit, which is characterized in that the feedback means are designed to detect whether hydraulic fluid is flowing from the pump to the reservoir via the pressure-relief valve or pressure-relief valves.

It is preferably provided for the feedback means to comprise a hydraulic flow sensor which is designed to detect the presence of a flow of hydraulic fluid to the reservoir via a pressure-relief valve.

As has been stated above, if no further hydraulic fluid is required for the movement of an actuator, for example because the said actuator has reached a limit position or the movement of the convertible top assembly is blocked, the hydraulic pressure will rise. To prevent this pressure from becoming dangerously high, it is therefore known to incorporate one or more pressure-relief valves. To control the sequence of movements, it is advantageous if it is detected whether fluid is flowing to the reservoir via a pressure-relief valve. For example, in the case of a control system which is based on the number of pumping movements, it could be that an actuator has already reached its limit position while the pump continues to operate and the fluid supplied by the pump flows away via a pressure-relief valve. In this event, the number of pumping movements provides little information as to the position of the actuator. Now, if it is known when the pressure-relief valve begins to discharge fluid, it is possible to determine from this how many pumping movements were actually required for the movement of the actuator.

This measure could also be used in the known solutions referred to in the introduction to reduce the time lag, by initiating the movement of another component of the convertible top assembly as soon as the pressure-relief valve is activated and fluid starts flowing to the reservoir.

A fourth aspect of the invention provides a hydraulic actuating device for a convertible top assembly of a motor vehicle, which actuating device comprises:
   a hydraulic pump with an associated electric pump motor, which pump has one or more delivery ports for delivering pressurized hydraulic fluid,
   a reservoir for hydraulic fluid,
   one or more hydraulic actuators, each for driving an associated movable part of the convertible top assembly,
   a control circuit for effecting a defined sequence of movements of the one or more actuators,
      which control circuit comprises a control unit and feedback means, which feedback means are designed to feed information relating to the sequence of movements of an actuator back to the control unit, which is characterized in that the feedback means comprise a hydraulic flow sensor which is designed to detect the presence of a flow of hydraulic fluid.

The information as to whether hydraulic flow is taking place at a specific location in the hydraulic system can advantageously be used to control the sequence of movements of the convertible top assembly. For example, there will no longer be any flow of fluid to or from an actuator when the actuator in question has reached a limit position. A flow sensor is easy to implement.

By way of example, the flow sensor is designed to detect a flow of hydraulic fluid from the pump to one or more of the actuators or from one or more of the actuators to the reservoir. In a practical embodiment, the pump has, for example, a single delivery port which, via a line, is connected to a valve block in which the hydraulic valves are accommodated. In this case, the flow sensor may be arranged between the delivery port and the valve block. If a pressure-relief valve is provided, the flow sensor is preferably positioned between this pressure-relief valve and the actuators, so that it is possible to establish whether or not hydraulic fluid is passing to the actuators.

A fifth aspect of the invention provides a hydraulic actuating device for a convertible top assembly of a motor vehicle, which actuating device comprises:

a hydraulic pump with an associated electric pump motor, which pump has one or more delivery ports for delivering pressurized hydraulic fluid, a reservoir for hydraulic fluid, one or more hydraulic actuators, each for driving an associated movable part of the convertible top assembly, a control circuit for effecting a defined sequence of movements of the one or more actuators, which control circuit comprises a control unit and feedback means, which feedback means are designed to feed information relating to the sequence of movements of an actuator back to the control unit, the feedback means comprising a temperature sensor and the control unit being designed to control the sequence of movements as a function of the measured temperature, wherein the temperature sensor is arranged at the electric motor of the pump.

As is known, motor vehicles are to be found in environments of highly divergent temperatures, varying from many degrees below zero to high temperature in the burning sun. The operation of the convertible top assembly and the associated actuating device will to a greater or lesser extent be dependent on this ambient temperature or on the temperature of a specific component, for example of the pump motor. The invention provides for this temperature to be measured and provides for the sequence of movements of the convertible top assembly to be controlled by a control unit which uses the measured temperature. The temperature sensor is accommodated at the pump motor. For example, if the current intensity passing through the pump motor is measured, it is useful to know the (starting) temperature of the windings of the pump motor, since the resistance of the windings is dependent on this temperature, for which purpose a temperature sensor may be arranged at the said windings. It should be noted that it is known to arrange a temperature sensor at this location in connection with protecting against overheating of the pump motor.

A sixth aspect of the invention provides for the outside temperature to be measured, which measurement is used in connection with the sequence of movements. By way of example, in the case of a convertible top assembly with a top made from some kind of fabric or cloth, much more force may be required at low temperatures in order to realize or initiate the sequence of movements. If the control unit knows the temperature, it is possible, for example, to allow for a greater consumption of electric power by the pump motor.

It will be clear that the aspects of the invention which have been described above can also advantageously be used in various combinations, which combinations also fall within the scope of the inventive idea.

The invention also relates to a convertible top assembly for a motor vehicle, and to a motor vehicle provided with a convertible top assembly and an electro-hydraulic actuating device therefor according to the invention.

Advantageous embodiments of the actuating devices according to the invention are described in the claims and the following description with reference to the drawing.

DETAILED DESCRIPTION OF PREFERRED EMBODIMENTS

Figure 1:
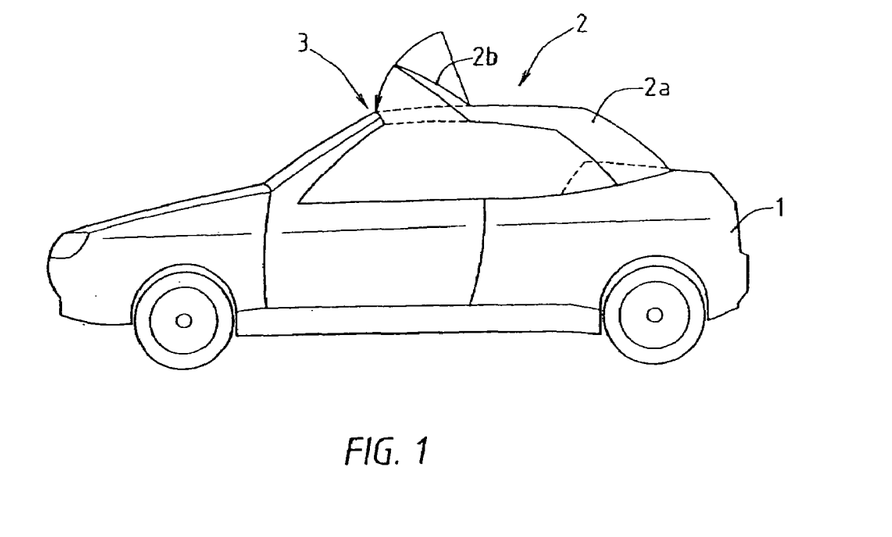
FIG. 1 shows a diagrammatic side view of an example of a motor vehicle with a movable convertible top assembly, FIG. 2 diagrammatically depicts the hydraulic actuating device according to the invention for actuating the convertible top assembly from FIG. 1.

The motor vehicle 1 shown in FIG. 1 is of the convertible type and has a movable convertible top assembly with a convertible top 2, which in the closed position covers the passenger compartment of the vehicle 1 and in an open position exposes this compartment. In this example, the convertible top 2 has a rear part 2a and a front part 2b, of which the front edge, in the closed position, bears in a sealed manner against the windscreen header 3. The movement of the front part 2b is derived from the movement of the rear part 2a via a kinematic mechanism which is known per se.

In FIG. 1, the front part 2b still has to execute a pivoting movement in order to come to bear against the windscreen header 3. Furthermore, the convertible top assembly comprises hydraulic locking means (not shown) for locking the convertible top part 2b with respect to the windscreen header 3. The convertible top may be designed in numerous different ways, not only with a cover made from cloth or fabric but also with rigid (panel-like) elements, etc. Furthermore, the convertible top assembly may also comprise, for example, a tonneau cover or a boot lid. It is also possible for hydraulic actuators for actuating a roll bar, windows, seats, further latches, headrests and the like to form part of the actuating device, depending on the design of the vehicle, in particular of the convertible top assembly.

Figure 2:
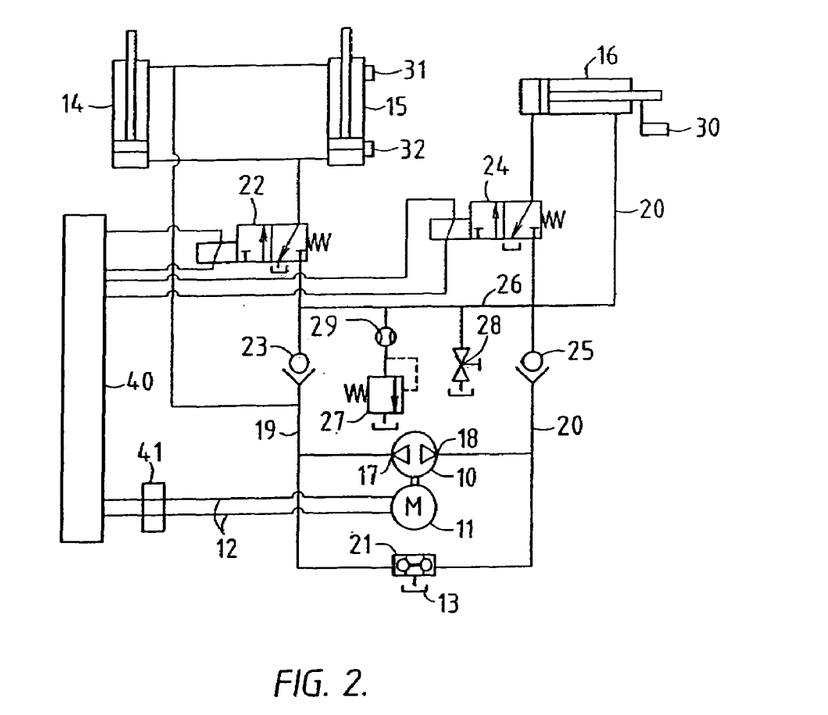

A hydraulic actuating device as shown in FIG. 2 is provided in the vehicle 1 for the purpose of actuating the convertible top 2 and the latching means of the convertible top in the closed position.

This actuating device, which is illustrated as a non-limiting example, comprises a hydraulic pump 10 with an associated electric pump motor 11. The pump 10 is, for example, a (radial) plunger pump. The pump motor 11 is in this case a high-speed (for example 3000 rpm) low-voltage DC motor (12V) with a reversible direction of rotation. In the example which follows, it is assumed that the supply voltage of the pump motor 11 is sufficiently constant for the electric power consumed by the pump motor 11 to be determined on the basis of the current intensity passed through the motor. Electric lines 12 which connect the motor 11 to an electric power supply, in practice the battery, are connected to the pump motor 11. Furthermore, a reservoir 13 for hydraulic fluid is provided.

To move the convertible top 2, a pair of double-acting hydraulic actuators 14, 15 which are connected in parallel are provided. A double-acting hydraulic actuator 16 is provided for the purpose of driving the latching means which connect the convertible top 2 to the windscreen header 3.

The pump 10 has two associated suction/delivery ports 17, 18 (depending on the pump direction). The port 17 is connected to a line 19 and the port 18 is connected to a line 20. Via a suction shuttle valve 21, the lines 19, 20 are connected to the reservoir 13. The line 19 is directly connected to the piston-rod-side chambers of each of the actuators 14, 15. Furthermore, the line 19 is connected, via an electromagnetically actuable 3/2 valve 22, to the base-side chambers of each of the actuators 14/15, a nonreturn valve 23 being provided which closes in the direction of the pump 10.

The line 20 is connected, via nonreturn valve 25 which closes in the direction towards the pump, to the piston-rod-side chamber of the actuator 16. Furthermore, the line 20 is connected, via an electromagnetically operated 3/2 valve 24, to the base-side chamber of the actuator 16.

A connecting line 26 with a pressure-relieve valve 27 and an emergency valve 28, which in this example can be actuated manually, is provided between the lines 19 and 20. The pressure-relieve valve 27 opens the connection to the reservoir 13 if the hydraulic pressure exceeds a defined pressure level.

At the actuator 16, a first position sensor 30 is provided, which is arranged and designed in such a manner that this sensor 30 is actuated when the latching means actuated by the actuator 16 adopt their locked position.

At the actuator 15, two limit-position sensors 31, 32 are provided, which are each arranged at a certain distance from the actual limit position of the actuator 15.

The hydraulic actuating device furthermore comprises a control circuit in which there is a control unit 40, which is coupled to the valves 22, 24 and to the pump motor 11 and which controls the action of these components for the purpose of effecting a defined sequence of movements of actuators 14, 15 and 16.

The sensors 30, 31, 32 are actively connected (via means which are not shown) to the control unit 40 and form feedback means for feeding information concerning the sequence of movements of the actuators 14, 15, 16 back to the control unit 40. The control unit 40 preferably comprises a microprocessor.

The feedback means furthermore comprise diagrammatically indicated measurement means 41, which are designed to measure the electric current intensity consumed by the pump motor 11. The measurement means 41 transmit the feedback signal to the control unit 40, which signal is utilized by the control unit 40 to control the sequence of movements of the actuators 14, 15 and 16.

To switch the power supply to the pump motor 11, an electrically actuable relay or a switchable semiconductor component is preferably arranged in the same housing as the control unit 40. In practice, in normal operation the current consumed by the pump motor 11 may amount to approximately 30–40 amps. In this case, the pump current-measuring means 41 are provided behind the said relay, within the same housing.

By way of example, the pump current-measuring means 41 can advantageously be used in the following way to control the sequence of movements of the convertible top assembly.

Assume that the convertible top 2 is closed and has been latched to the windscreen header 3. Then, when the convertible top 2 is being opened, first of all the actuator 16 is actuated, in such a manner that its piston rod extends. As a result, the latching means will leave their latched position, which is detected by the sensor 30. When the sensor 30 detects that this has taken place, the control unit 40 is therefore aware that the actuator 16 is moving towards its extended position. To prevent the actuators 14, 15 from setting the convertible top 2 in motion before the latching has been fully released, it is desirable to wait until the actuator 16 has reached its fully extended position. To establish that this has occurred, the current which is consumed by the pump motor 11 is measured using the pump current-measuring means 41. This is because when the actuator 16 has been fully extended, the hydraulic pressure in the system will rise, with the result that the current consumed by the pump motor 11 will also increase relatively quickly. The control unit 40 then compares the feedback signal from the pump current-measuring means 41 with a predetermined value. If this value is exceeded, the actuator 16 has reached its extended limit position. Actuation of the actuators 14, 15 can then commence, in order for the convertible top 2 to be opened.

During the actuation of the actuators 14, 15, the measurement of the current consumed by the pump motor 11 can once again be used to control the sequence of movements. For example, when the convertible top 2 is opened, the sensor 32 will transmit a signal to the control unit 40 shortly before the convertible top 2 has been completely opened. This control unit 40 can then detect whether the current consumed by the pump motor 11 exceeds a defined value as a result of the further movement of the actuators 14, 15 being prevented because the convertible top 2 is resting against a stop in a storage compartment of the vehicle. The pump 10 can then be switched off.

It is also conceivable for the current consumed by the pump motor 11 to be measured throughout the entire sequence of movements of the convertible top assembly instead of during one or more partial periods of this overall sequence of movements as described above.

It is also conceivable for the control unit 40 to comprise a memory in which a curve or table or the like of the desired feedback signal from the pump current-measuring means 41 is stored, in which case the actual feedback signal is compared with this curve or the like. In this way, it is also possible to obtain information about the position of the moveable components of the convertible top, in particular because the hydraulic pressure required for moving the convertible top assembly during the sequence of movements is not constant, but rather varies.

Instead of or in combination with the determination of the value of the current intensity consumed by the pump motor 11, it is also possible to analyze whether the current intensity consumed undergoes a specific change. For example, when a limit position is reached by the actuator 16, it is possible to detect that the current intensity begins to rise relatively rapidly. By detection of this change, it is possible for the control unit 40 to establish that the limit position has evidently been reached.

It will be clear that it is also possible to provide for the supply voltage of the pump motor 11 to be measured, so that the power consumed by the motor 11 can be determined even in the event of a fluctuating supply voltage.

As stated above, the pump 10 may comprise one or more pump elements, for example plungers in the case of a plunger pump, which are able to execute a pumping movement for the purpose of pumping hydraulic fluid. The associated electric pump motor 11 has a rotatable shaft (not shown) which is coupled to the pump 10. For each pumping movement, the pump elements only pump a small quantity of fluid, so that a large number of pumping movements are required in order to move an actuator.

In practice, the shaft of the motor 11 in actuating devices of this type often rotates at a high speed (for example 3000 rpm). The duration of actuation for complete opening or closure of a convertible top assembly is usually between 15 and 45 seconds, so that at least many hundred revolutions of the motor shaft of the pump 10 are required for a complete sequence of movements of the convertible top assembly.

It is advantageously possible for detection means which are connected to the control unit 40 for the sequence of movements to be provided for the purpose of directly or indirectly detecting pumping movements executed by the pump elements. This is because each pumping movement is representative of a small part of the overall sequence of movements of the convertible top assembly.

In an embodiment which is advantageous in practice, the feedback means are designed to detect revolutions of the shaft of the pump motor and/or the revolutions of a rotatable component of the pump which is connected thereto. This may, for example, take place by arranging one or more magnets on the motor shaft and detecting the passage thereof by means of one or more magnetic field sensors. A simple way of controlling the sequence of movements of the convertible top assembly provides for a specific number of revolutions of the motor shaft to be required for a part of the sequence of movements, so that by counting these revolutions it is possible to keep up to date with what proportion has already taken place. If, for example halfway through a first part of the sequence of movements, for example the opening of the tonneau cover, a further part of the sequence of movements, for example the closure of the convertible top, can be initiated, it is easy to establish that this starting point has been reached by counting the revolutions of the pump motor shaft. In this case, it is advantageous to provide the control unit with a learning mode, in which the number of revolutions of the motor shaft which is actually required is constantly compared with a number of revolutions which is expected in the memory of the control unit and in which, if necessary the information in the memory can be adapted.

As an alternative to detecting the number of revolutions of the motor shaft, direct detection of the pumping movements executed by one or more of the pump elements could, for example, take place. By way of example, a pump element is magnetic and its movement can be detected using a magnetic field sensor.

In an advantageous embodiment, it is provided that the feedback means are designed to detect the revolutions of the pump motor on the basis of fluctuations in the electric power of the pump motor, in particular voltage peaks caused by the carbon brushes of the pump motor. This solution does not require any separate features to be provided on the pump or pump motor and the means required for this purpose may advantageously be accommodated in the same housing as the control unit for the sequence of the movements.

In a hydraulic actuating device for a convertible top assembly of a motor vehicle, for example as shown in FIG. 2, it is also possible to provide for the feedback means, which are connected to the control unit and are used to feed information relating to the sequence of movements of an actuator back to the control unit, to be designed to detect whether hydraulic fluid is flowing from the pump 10 to the reservoir 13 via the pressure-relieve valve 27. For example, if, when the actuators 14, 15 are being actuated, these actuators 14, 15 reach a limit position, it will not be possible for any further fluid to be supplied to these actuators 14, 15 by the operating pump 10. Consequently, the hydraulic pressure rises rapidly until the pressure-relieve valve 27 opens. The opening of this valve 27 is therefore an indication that the limit position has been reached, which can be utilized as a feedback signal by the control unit 40, if appropriate in combination with other parameters such as, for example, the electric power consumed by the pump motor 11 or the signals from one or more position pick-ups.

By way of example, the pressure-relieve valve 27 itself is provided with a sensor which detects the position of the moveable valve body of the pressure-relieve valve 27.

In a variant which is shown in FIG. 2, an optional hydraulic flow sensor 29, for example, of the type which is to be explained with reference to FIG. 4 and is designed to detect the presence of a flow of hydraulic fluid to the reservoir 13 via the pressure-relieve value 27, is provided.

In the context of the feedback to the control unit which is responsible for the sequence of movements of the convertible top assembly, it is also possible for a hydraulic flow sensor to be arranged at a location other than that described above, which sensor is designed to detect the presence of a flow of hydraulic fluid at this location.

Figure 5:
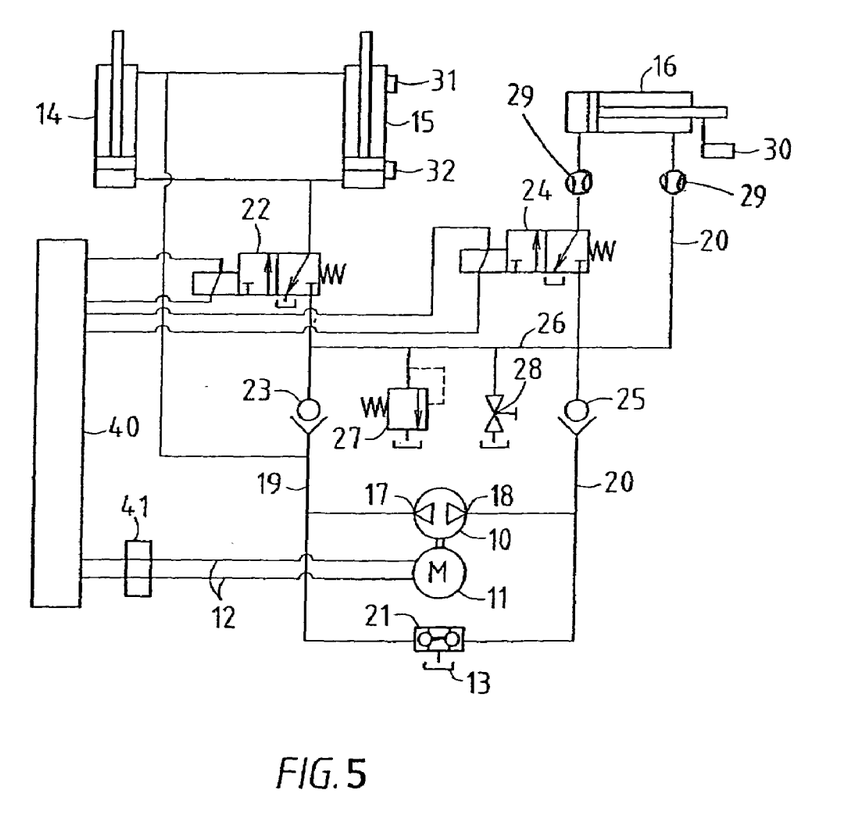
FIG. 5 diagrammatically depicts an alternate embodiment of the hydraulic actuating device according to the invention for actuating the convertible top assembly of FIG. 1.

For example, it is possible to provide for the flow sensor 29 to be designed to detect a flow of hydraulic fluid from the pump 10 to one or more of the actuators 14, 15, 16 or from one or more of the actuators 14, 15, 16 to the reservoir 13 (see example of FIG. 5). If the flow sensor then detects that the flow has been eliminated altogether or is decreasing considerably, this means that the associated actuator is no longer moving and has probably reached its limit position.

The use of a flow sensor in the context of controlling the sequence of movements of a convertible top assembly is advantageous in particular if, during operation of the actuating device, the hydraulic pressure is close to the maximum pressure defined by the pressure-relieve valve(s) of the actuating device. This is the case, for example, if an actuator is operated in regenerative mode. In applications of this type, by way of example, measurement of the electric power consumed by the pump provides little information. Also, during regenerative operation of an actuator, it is already possible for flow to take place to the reservoir via the pressure-relieve valve, so that detecting the pumping movements also fails to provide sufficient information. In such cases, a flow measurement does provide the desired information.

Figure 6:
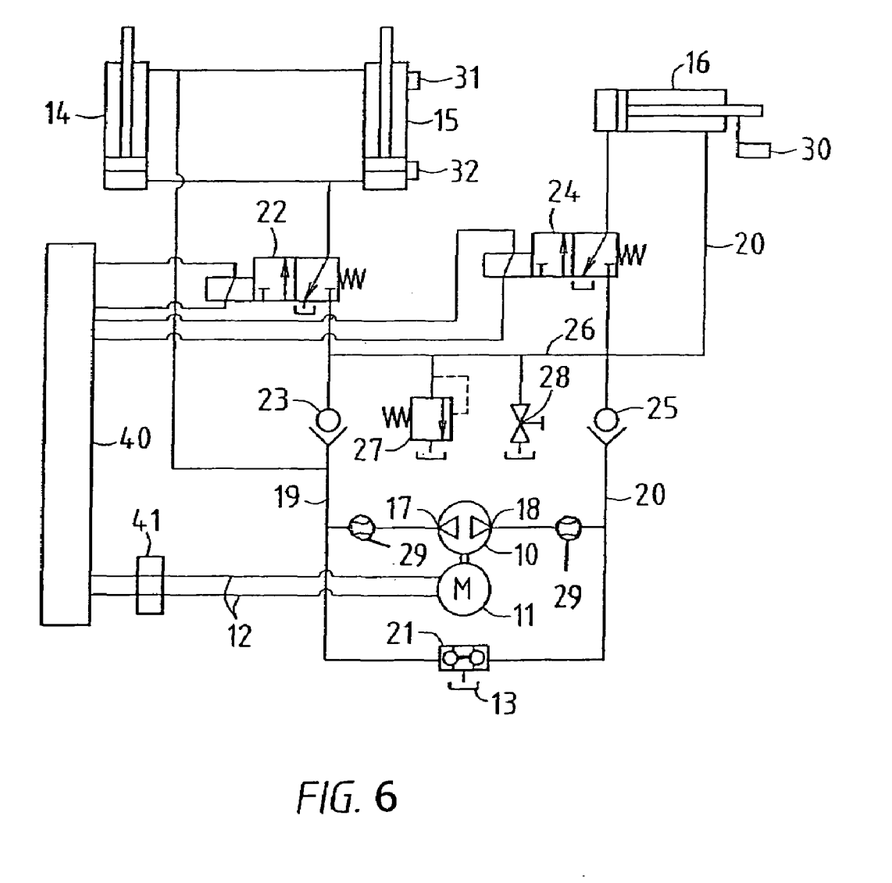
FIG. 6 diagrammatically depicts an alternate embodiment of the hydraulic actuating device according to the invention for actuating the convertible top assembly of FIG. 1.

It is possible to provide for a flow sensor 29 to be positioned at each delivery port 17, 18 or the pump 10 (FIG. 6). These sensors can then also be used to monitor the operation of the pump 10.

Figure 3:
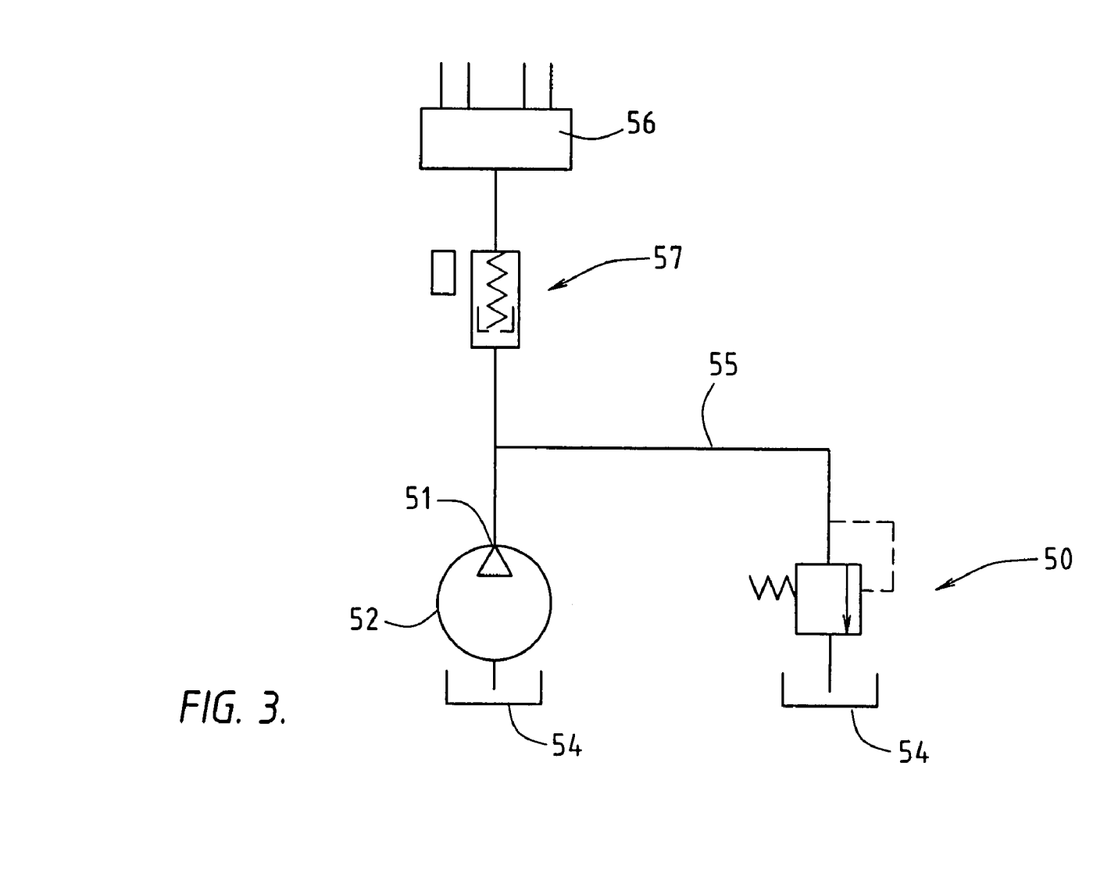
FIG. 3 shows part of a circuit diagram of a hydraulic actuating device according to the invention and, FIG. 4 shows a cross section through an exemplary embodiment of a flow sensor for an actuating device according to the invention.

FIG. 3 diagrammatically depicts the fact that a pressure-relieve valve 50 is provided between the delivery port 51 of the pump 52 and the reservoir 54, which valve 50 opens if the hydraulic pressure exceeds a defined value.

A line 55 leading to a valve block 56 is connected to the delivery port 51, and the lines leading to the one or more actuators are connected to this line 55. A flow sensor 57, an exemplary embodiment of which is shown in detail in FIG. 4, is accommodated in the line 55.

Figure 4:
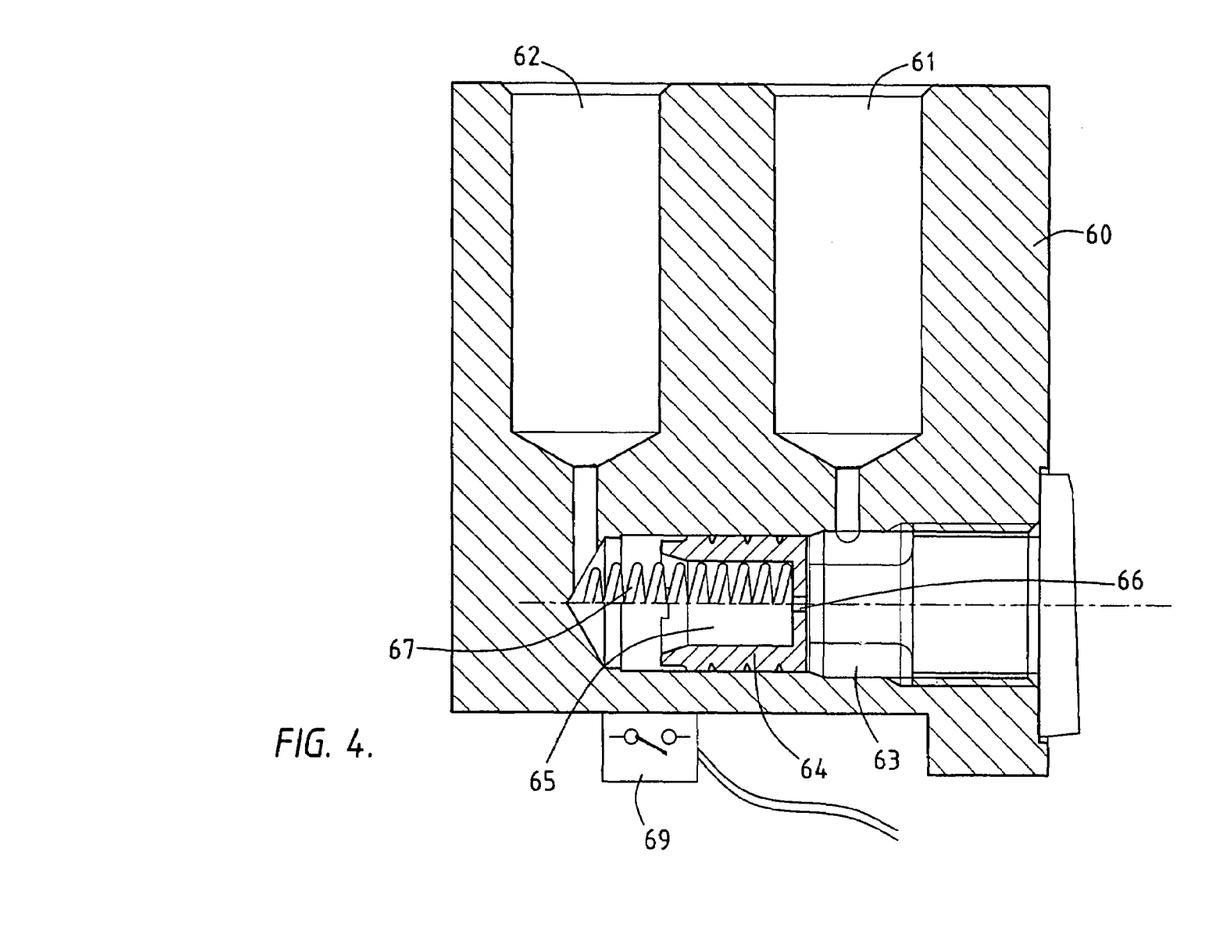

FIG. 4 shows a housing 60 made from aluminium or other non-magnetic material, with an inlet bore 61 and an outlet bore 62 which are connected by a connecting bore 63. A reciprocatingly movable slide body 64 with a passage 65 is accommodated in the connecting bore 63. The passage 65 is provided with an orifice 66. A restoring spring 67 presses the sliding body 64 towards the inlet bore 61. If hydraulic fluid is supplied via the inlet bore 61 and this fluid is able to flow out via the outlet bore, flow will take place through the passage 65. The hydraulic resistance generated by the orifice 66 causes the slide body 64 to be displaced, counter to the spring 67, towards the outlet bore 62. The slide body 64 is in this case made from a magnetic material, for example steel. A magnetic field sensor 69, for example a Hall sensor, detects the displacement of the slide body 64 under the influence of the flow through the orifice 66. If the flow drops away, the spring 67 returns the slide body 64, which is detected by the sensor 69.

In the case of a hydraulic actuating device for a convertible top assembly of a motor vehicle, it is also possible, if appropriate in combination with one or more of the measures described above, to provide for the feedback means connected to the control unit to comprise a temperature sensor and for the control unit to be designed to activate the sequence of movements as a function of the measured temperature As mentioned before, the ambient temperature in which a motor vehicle with movable convertible top assembly is situated may vary substantially, from well below zero to very hot. The components which are responsible for actuation of the convertible top assembly and the components of the convertible top assembly will perform differently at different temperatures. For example, it is easy to imagine that more force is required to open a convertible top if the vehicle is cold than if the vehicle is warm. This effect can be caused, for example, in the case of a top with a cover made from cloth or fabric by the stiffness of the said cloth or fabric. Furthermore, the temperature of the hydraulic fluid of the hydraulic actuating device may have an effect, since it affects the viscosity.

The invention provides for the control unit to take the temperature into account when controlling the actuating device. To do this, the ambient temperature could be measured, which temperature can be measured, for example, using a temperature sensor which is already present in connection with, for example, providing an indication of temperature on the dashboard or for the purpose of controlling the heating and/or air-conditioning installation of the motor vehicle. In a very simple variant, the control unit for the sequence of movements of the convertible top assembly would only recognize the "cold" and "warm" states. In this case, if it is cold, a greater power consumed by the electric motor of the pump could be deemed acceptable or an extra long duration for each partial movement could be allowed for.

In the context of measuring the power consumed by the pump motor and/or in the context of the influence of the temperature on the viscosity of the hydraulic fluid, it is preferably provided for a temperature sensor which is coupled to the control unit for the sequence of movements to be arranged at the electric motor of the hydraulic pump.

It is preferably provided for a temperature sensor which is coupled to the control unit for the sequence of movements to be accommodated in or at the windings of the pump motor. This is because the starting temperature of the windings also has an effect on the electrical resistance of these windings and therefore on the electric power consumed by the pump. On the other hand, the same temperature sensor can also be used to protect the pump motor against overheating.

What is claimed is:

1. A hydraulic actuating device for a convertible top assembly of a motor vehicle, which actuating device comprises:
   a hydraulic pump, which pump has one or more delivery ports for delivering pressurized hydraulic fluid,
   one or more hydraulic actuators, each for driving an associated movable part of the convertible top assembly,
   a control circuit for effecting a defined sequence of movements of the one or more actuators,
   which control circuit comprises a control unit and a flow sensing device, the flow sensing device being designed to detect whether hydraulic fluid is flowing and to feed a feedback signal to the control unit, wherein the control unit correlates the feedback signal to a sequence of movements of an actuator.

2. A hydraulic actuating device according to claim 1, further comprising:
   a reservoir for hydraulic fluid, and wherein the flow sensing device comprises a
   a pressure-relief valve and the feedback signal corresponds to a detection as to whether hydraulic fluid is flowing from the pump to the reservoir via the pressure-relief valve.

3. A hydraulic actuating device according to claim 2, in which the flow sensing device further comprises a hydraulic flow sensor which is designed to detect the presence of a flow of hydraulic fluid to the reservoir via the pressure-relief valve.

4. A hydraulic actuating device according to claim 2, in which the flow sensing device further comprises a detection means which detect whether hydraulic fluid is being passed to the reservoir via the pressure-relief valve.

5. A hydraulic actuating device according to claim 4, in which the detection means comprise a sensor which detects the position of a moveable valve body of the pressure-relief valve.

6. A hydraulic actuating device according to claim 1, in which the flow sensing device comprises a hydraulic flow sensor which is designed to detect the presence of a flow of hydraulic fluid.

7. A hydraulic actuating device according to claim 6, further comprising a reservoir for hydraulic fluid, in which the hydraulic flow sensor is designed to detect a flow of hydraulic fluid from the pump to one or more of the actuators or from one or more of the actuators to the reservoir.

8. A hydraulic actuating device according to claim 6, in which the hydraulic flow sensor is positioned at a delivery port of the pump.

9. A hydraulic actuating device according to claim 6, in which
   a pressure-relief valve is provided, which is able to connect the one or more delivery ports of the pump to the reservoir if the hydraulic pressure exceeds a defined value, and in which
   the hydraulic flow sensor is arranged between the pump and the one or more actuators, downstream of the connection for the pressure-relief valve.

10. A hydraulic actuating device according to claim 1, in which electrically actuable hydraulic valve means are provided for the purpose of activating the one or more hydraulic actuators, and in which the control unit is connected to the valve means and controls the action thereof for the purpose of effecting a defined sequence of movements of the one or more actuators.

11. A hydraulic actuating device according to claim 1, in which electrically actuable hydraulic valve means are provided for the purpose of activating the one or more hydraulic actuators, and in which the control unit is connected to the pump motor and controls the action thereof for the purpose of effecting a defined sequence of movements of the one or more actuators.

12. A hydraulic actuating device according to claim 1, in which the control unit comprises a memory, in which a predefined, desired behaviour of the feedback signal is stored, which behaviour at least relates to a section of the sequence of movements of the one or more actuators, and in which the control unit is designed to compare the present feedback signal with the predefined, desired behaviour of the said feedback signal.

13. A hydraulic actuating device according to claim 1, in which the control unit comprises a memory, in which a predefined, desired behaviour of the feedback signal is stored, which behaviour at least relates to a section of the sequence of movements of the one or more actuators, and in which the control unit is designed to compare the present feedback signal with the predefined, desired behaviour of the said feedback signal, and in which the predefined, desired behaviour comprises at least one of the value of the feedback signal and the extent of change in the feedback signal.

14. A hydraulic actuating device according to claim 1, further comprising at least one position sensor coupled to the control unit to provide a position feedback signal to the control unit, which is arranged at an actuator for detecting the position of the actuator.

15. A hydraulic actuating device according to claim 1, in which the feedback means further comprising at least one position sensor coupled to the control unit to provide a feedback signal to the control unit, which is arranged at a part of the convertible top assembly for detecting the position of the part of the convertible top assembly.

16. A motor vehicle provided with the convertible top assembly according to claim 1.

17. A hydraulic actuating device for a convertible top assembly of a motor vehicle, which actuating device comprises:
  a hydraulic pump, which pump has one or more delivery ports for delivering pressurized hydraulic fluid,
  one or more hydraulic actuators, each for driving an associated movable part of the convertible top assembly,
  a control circuit for effecting a defined sequence of movements of the one or more actuators,
  which control circuit includes a flow sensing device to detect the presence of a flow of hydraulic fluid and produce a feedback signal in response to the detected flow and a control unit that receives the feedback signal from the flow sensing device,
  wherein the feedback signal provides an indication of the sequence of movements of an actuator back to the control unit, and
  wherein the control unit monitors the feedback signal to control the movements of the one or more hydraulic actuators to effect movement of the convertible top assembly.

18. A hydraulic actuating device according to claim 17, further comprising:
  a reservoir for hydraulic fluid, and wherein the flow sensing device is
  a pressure-relief valve, which is able to connect the one or more delivery ports of the pump to the reservoir if the hydraulic pressure exceeds a defined value to detect the position of a moveable valve body of the pressure-relieve valve.

19. A hydraulic actuating device according to claim 17, further comprising a reservoir for hydraulic fluid, in which the hydraulic flow sensor is designed to detect a flow of hydraulic fluid from the pump to one or more of the actuators or from one or more of the actuators to the reservoir.

20. A hydraulic actuating device according to claim 17, in which the hydraulic flow sensor is positioned at a delivery port of the pump.

21. A hydraulic actuating device according to claim 17, in which the flow sensing device further comprises
  a pressure-relief valve which is able to connect the one or more delivery ports of the pump to the reservoir if the hydraulic pressure exceeds a defined value, and in which
  the hydraulic flow sensor is arranged between the pump and the one or more actuators, downstream of the connection for the pressure-relief valve.

22. A hydraulic actuating device according to claim 17, in which the hydraulic flow sensor comprises:
  a housing, with an inlet, an outlet, and a connecting bore, connecting the inlet and the outlet,
  a moveable body, accommodated in the connecting bore,
  a displacement sensor, for detecting a displacement of the moveable body under the influence of the flow.

23. A hydraulic flow sensor, suitable for a hydraulic actuating device for a convertible top assembly of a motor vehicle, in which the hydraulic flow sensor comprises:
  a housing, with an inlet, an outlet, and a connecting bore, connecting the inlet and the outlet,
  a moveable body accommodated in the connecting bore, and including a passage provided with an orifice sized and dimensioned to generate a hydraulic resistance causing the slide body to be displaced in response to a fluid flow through the connecting bore,
  wherein the inlet and the outlet are in communication for allowing a hydraulic fluid flow from the inlet to the outlet and through said moveable body, and
  a displacement sensor, for detecting a displacement of the moveable body under the influence of the flow.

24. A hydraulic flow sensor according to claim 23, in which the moveable body comprises magnetic material and the displacement sensor is a magnetic field sensor.

25. A hydraulic flow sensor according to claim 23, in which the moveable body is provided with said orifice, wherein the inlet and the outlet are in communication through said orifice, for allowing a flow of hydraulic fluid through the moveable body.

26. A hydraulic flow sensor according to claim 23, further comprising a restoring spring for pressing the moveable body towards the inlet.

* * * * *

UNITED STATES PATENT AND TRADEMARK OFFICE
CERTIFICATE OF CORRECTION

PATENT NO. : 7,204,083 B2
APPLICATION NO. : 11/061246
DATED : April 17, 2007
INVENTOR(S) : Laurentius Andreas Gerardus Mentink et al.

It is certified that error appears in the above-identified patent and that said Letters Patent is hereby corrected as shown below:

Column 12, Line 24
"value 27" should be
--valve 27--

Signed and Sealed this

Sixteenth Day of October, 2007

JON W. DUDAS
*Director of the United States Patent and Trademark Office*